Figure 2:
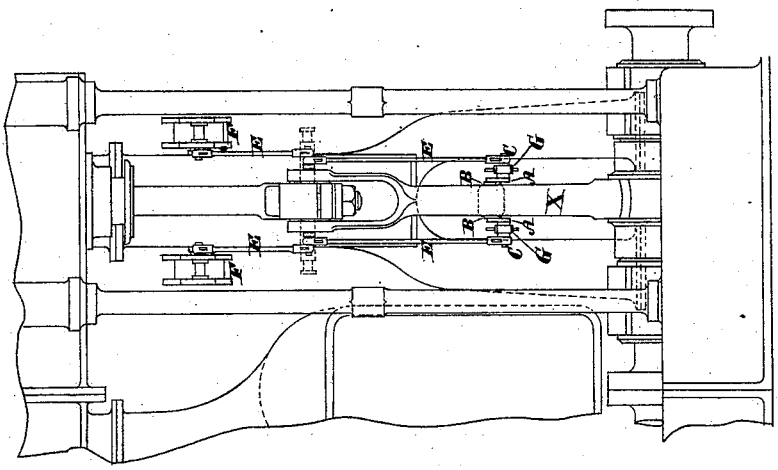

(No Model.)  5 Sheets—Sheet 1.
A. MORTON.
VALVE GEAR.
No. 281,548.  Patented July 17, 1883.
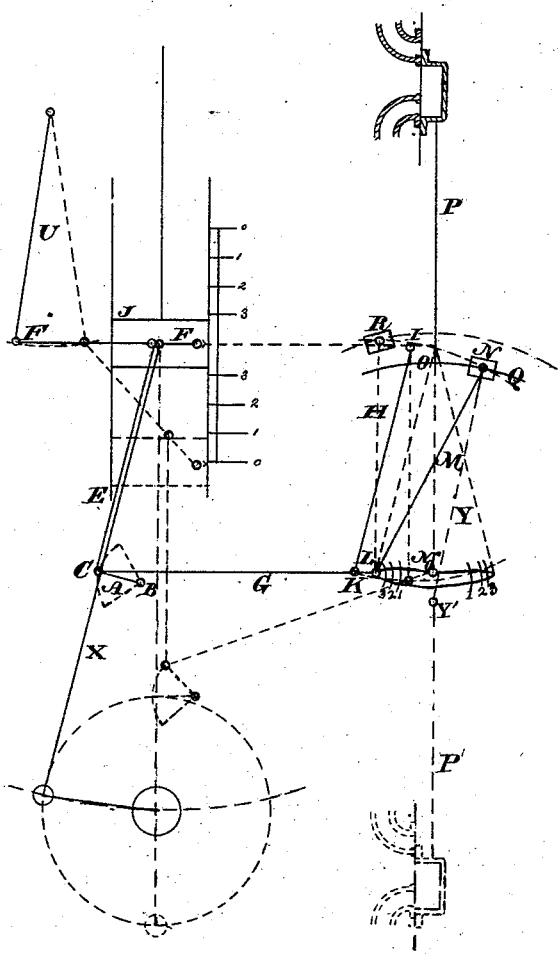
Attest  
Inventor  
Alexander Morton  
By Knight Bros  
Attys (No Model.)  A. MORTON.  5 Sheets—Sheet 2.
VALVE GEAR.
No. 281,548. Patented July 17, 1883.
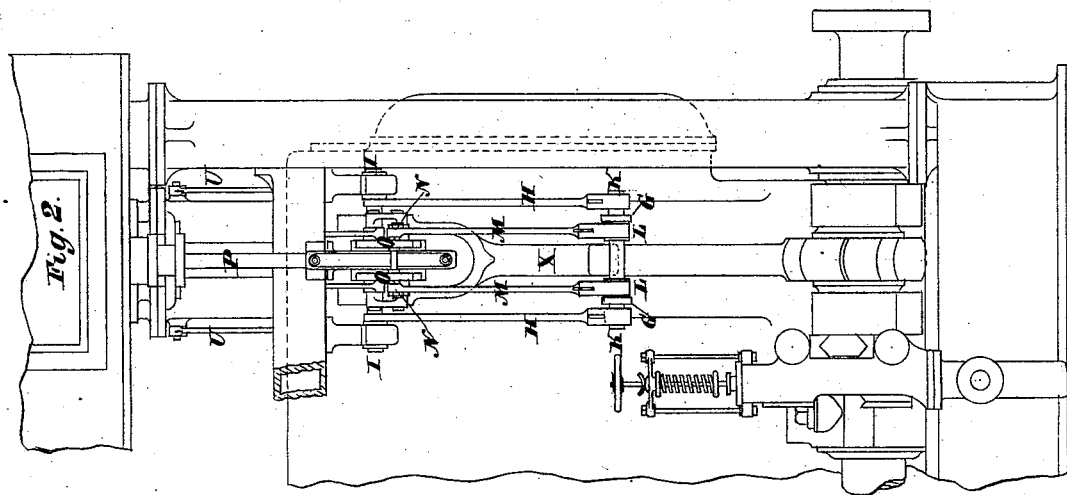
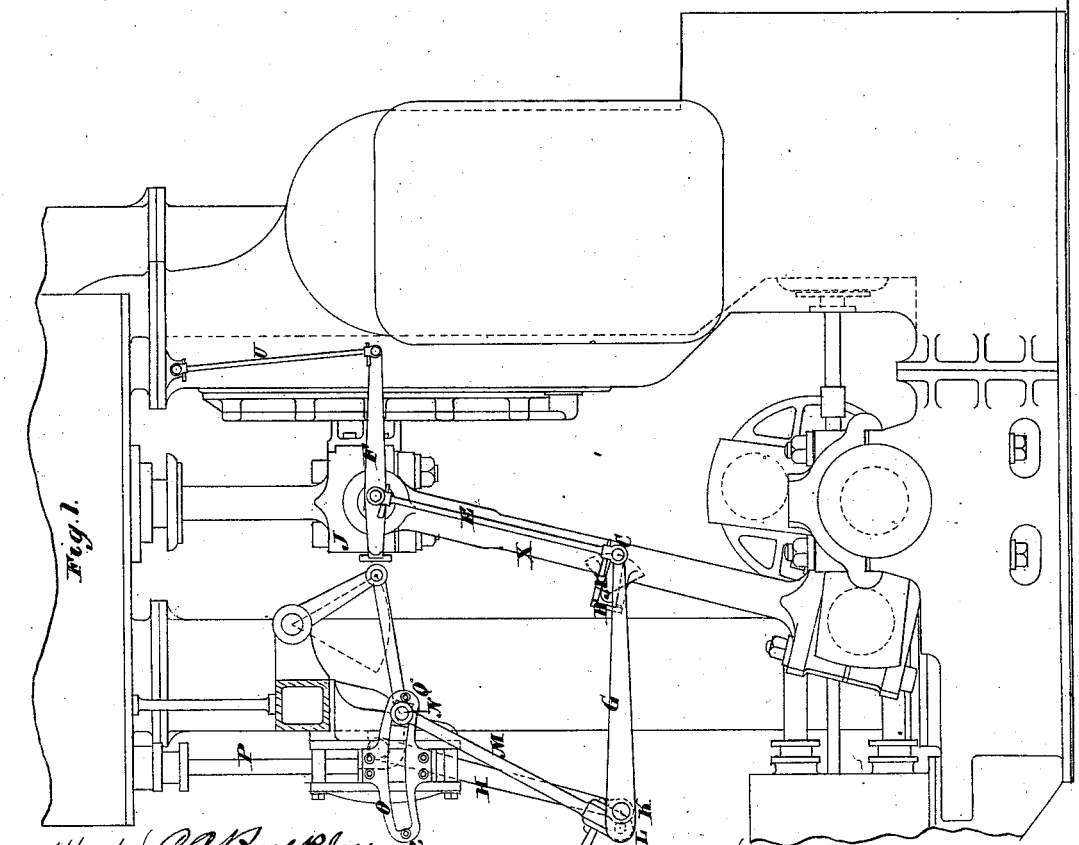

(No Model.)  A. MORTON.  5 Sheets—Sheet 3.

VALVE GEAR.

No. 281,548. Patented July 17, 1883.

Attest:
C. C. Buckley.
Wm. F. Sayers.

Inventor
Alexander Morton
By Knight Bros
attys (No Model.)
A. MORTON.
VALVE GEAR.
No. 281,548.
5 Sheets—Sheet 4.
Patented July 17, 1883.
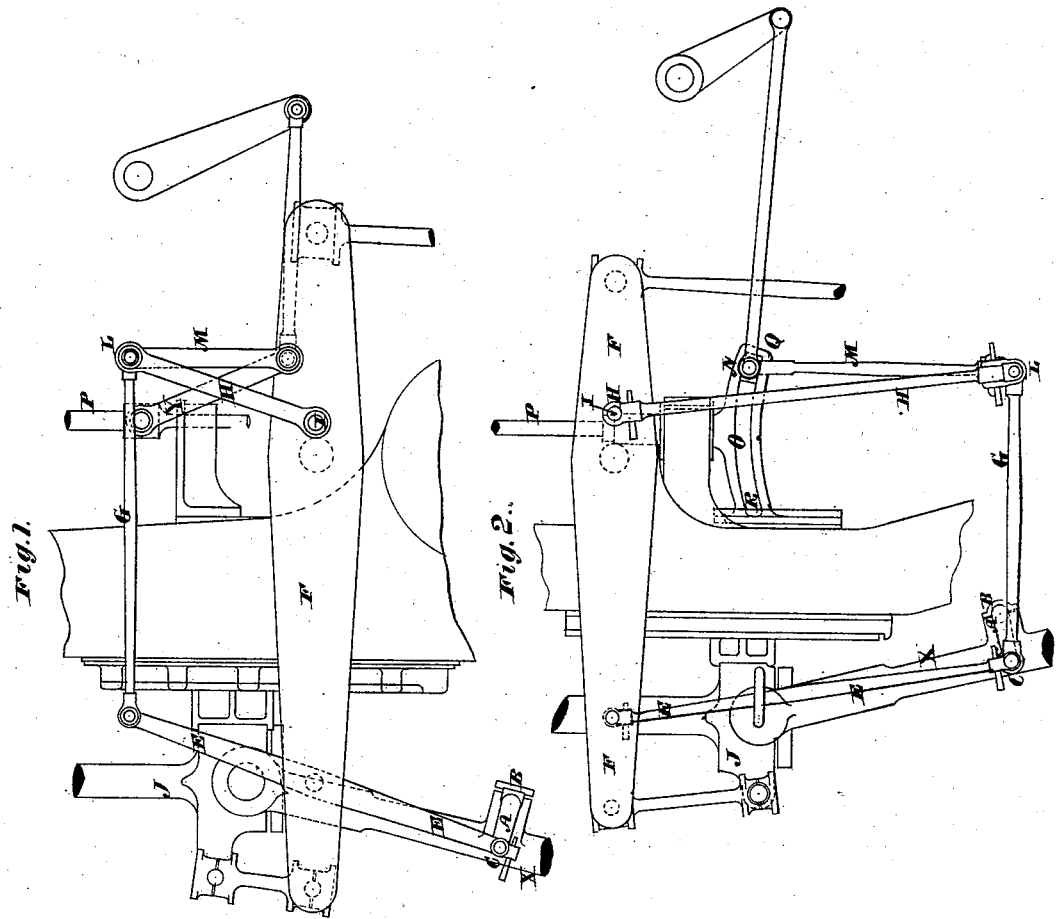
Attest:
Wm. F. Sayers
Herbert Knight
Inventor
Alexander Morton
By Knight Bros
attys.

(No Model.)  5 Sheets—Sheet 5.
A. MORTON.
VALVE GEAR.
No. 281,548.  Patented July 17, 1883.
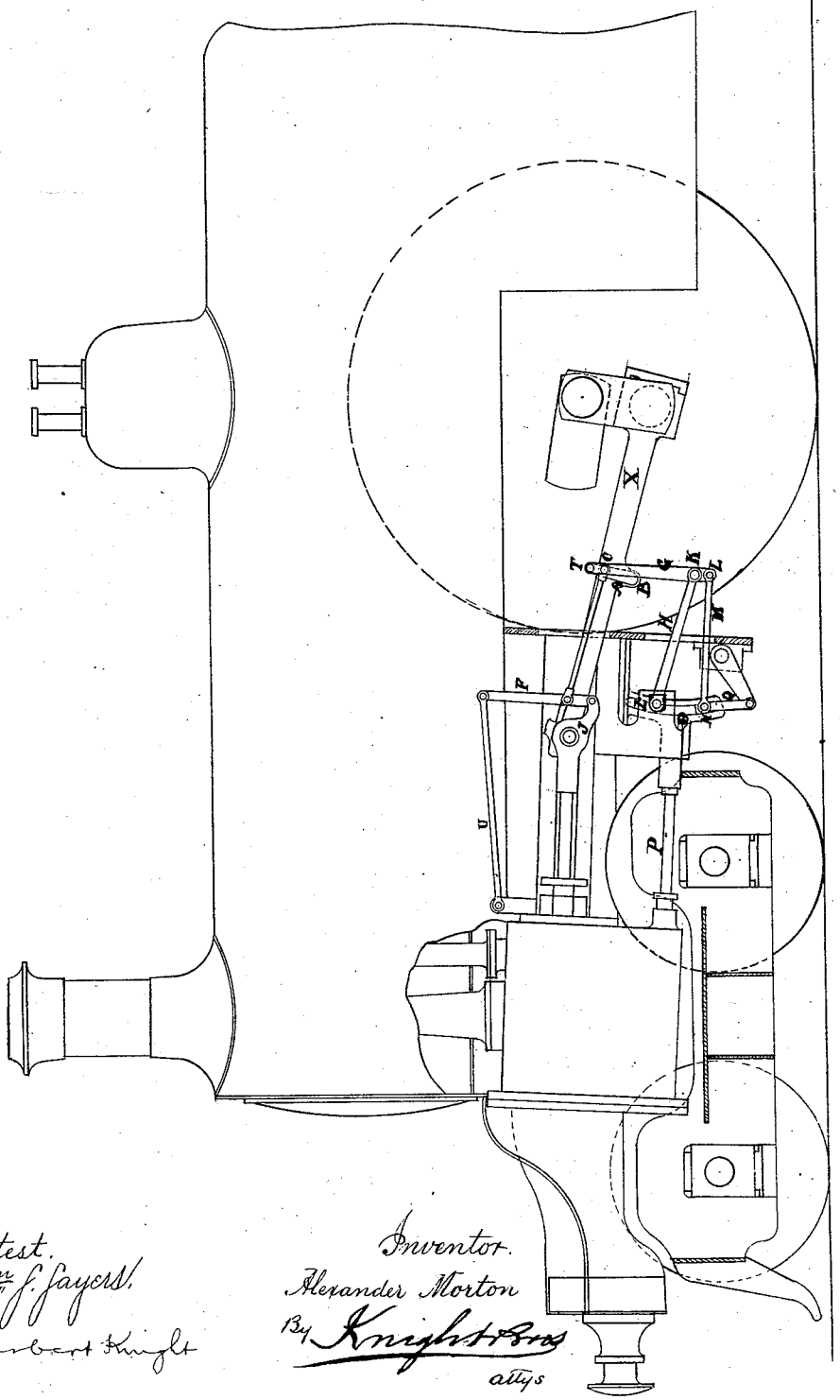

UNITED STATES PATENT OFFICE.

ALEXANDER MORTON, OF GLASGOW, COUNTY OF LANARK, SCOTLAND.

VALVE-GEAR.

SPECIFICATION forming part of Letters Patent No. 281,548, dated July 17, 1883.

Application filed January 8, 1883. (No model.) Patented in England March 28, 1882, No. 1,490, and in Canada October 25, 1882, No. 15,651.

*To all whom it may concern:*

Be it known that I, ALEXANDER MORTON, a citizen of the United Kingdom of Great Britain and Ireland, residing at Glasgow, in the county of Lanark, Scotland, have invented Improvements in Valve-Gears for Steam-Engines, of which the following is a specification.

In order that my invention may be fully understood I will proceed to describe the system, mode, or manner in or under which the same is or may be used or carried out in practice, reference being had to the several figures on the five sheets of drawings hereunto annexed, the same letters of reference indicating corresponding parts in all the figures.

It is well known that a fixed point on the line of the connecting-rod of all reciprocating engines describes the path of an elliptical figure which somewhat resembles the contour of an egg, the larger end being nearest to the crank; and should the connecting-rod be very short in relation to the stroke of the engine, the lateral motion of the said point during the inner half is much less than that produced during the outer half of the stroke. Consequently the path described by a fixed point becomes a very irregular elliptical figure.

My invention consists, first, in improved means for actuating a movable point or center so adjusted that in an engine such as is indicated by the diagram on Sheet 1, the said movable point or center shall travel relatively to the connecting-rod toward the crank during the inner stroke and from the crank during the outer stroke, thus producing the path of an elliptical figure whose minor ordinates are or may be equal when measured from the center of the figure. If the said movable point or center be moved along the center line of the connecting-rod, the major axis of the figure becomes a straight line; but the improvements under the first part of my said invention consist, chiefly, in the means employed for actuating the said movable point or center so that it may radiate on or equally across the center line of the connecting-rod, and thus describe the path of an elliptical figure whose major axis becomes a segment of a circle, and where the major and minor ordinates intersect each other they form the elliptical path. The connecting-rod X in this diagram is repre- sented to be of a length twice that of the stroke of the engine, and the short lever or spanner A to radiate from a point, B, on a projection on the connecting-rod at about one-half the length of the latter. The radiating movable point or center C receives its relative motion from an overhung lever, F, one end of which is connected direct to and worked by the crosshead J in such a manner that the point of the lever to which the link E is connected shall radiate through an arc crossing a line through the centers of the engine. The other end of the lever F may travel in a cross-slide; or it may vibrate with a link, U. The movable point or center C describes an elliptical path whose minor ordinates are equal, or nearly so, when measured at equidistant points from the minor axis, or center of the figure, when the major axis is about three-fourths of the stroke of the engine. With any practical length of connecting-rod, and with the point or center C radiating across the center line at any point in the length of the said rod, if the major axis of the path described be too short, the minor ordinates will be greatest during the latter half of the inner stroke, and vice versa, if the major axis be too long—a mean producing the required regular figure—that is to say, the nearer the point C is brought to the crank end of the connecting-rod X the less will be the difference from the center to the ends of the lever F to produce the required regular figure, and vice versa.

The improvements under the second part of my said invention are also indicated by the diagram, Sheet 1; and they consist in connecting one end of a simple lever, G, with the radiating point or center C, so that that end may follow the said point C through the elliptical path and at a radius equal to that of the major axis. The lever G is connected with links H, vibrating from fixed centers I, so that the links H are always parallel with the connecting-rod X when the parts are proportioned as shown by Sheet 1, and consequently always in the middle of their vibration when the engine is at the termination of its stroke "on the center," as shown in dotted lines at No. 0, for every equidistant movement of the piston cross-head J in either forward or backward gear. The said links H give an exactly proportionate vibration to the right or left of the center. It will be understood that if the centers K of the simple levers G be disconnected from the two vibrating links H and made to describe a radius from the movable point or center C, they will for every movement of the piston-rod correspondingly marked form those arcs marked 1 2 3 upon a segment of a circle exactly equal to the radius of the vibrating links H. Should the length of the simple lever G be greater than the radius of the major axis of the elliptical figure, the crosses 1 2 3 farther from the engine will be closer together than those nearer the engine; and should the length be less, the proportionate distance between the crosses will be the reverse—a mean producing exact equality. The diagram, Sheet 1, represents a vertical engine with the first and second parts of my invention combined, so as to illustrate the third and last part. The simple lever G, whose fulcrum K vibrates with the links H, has a short extended center, L, which partakes of two motions. The links H vibrate from right to left, and carry the fulcrum K of the lever G, whose longer end, being connected with the movable point or center C, must follow the elliptical path of the point C. Consequently the shorter end center, L, must describe an elongated figure whose major axis must agree with the minor axis of the path described by the movable point or center C, and whose minor axis must be a proportional agreeing with the differences of the distances between the fulcrum K and the end centers, C and L—that is to say, as K C is to K L, so is the major axis of the larger path to the minor axis of the smaller path.

The third part of my said invention consists in attaching one end of an adjustable link or links, M, to the said short extended center L, so that it or they shall vibrate between the links H, and follow the path shown on diagram, Sheet 1, while the other end, N, may be adjusted to the right or left of the center of the curved bar or slot O, which latter may be made in one piece with the slide-valve rod P or be fixed thereto, so as to form the letter T inverted. When in the central position, the adjustable end N will travel exactly equal with the minor axis of the smaller elliptical figure or path described by the center L; but when moved to the right, as at Q, the engine is in full gear backward or forward, and when moved to the left, as shown by the dotted lines at R, the engine is in full gear in the reverse direction, and when in any intermediate position the engine will work more or less expansively. When the center N is nearest the center of the curved slot or bar O, the expansion is greatest, and when equidistant on either side of the center an equal distribution is given to both ends of the cylinder, whether in forward or backward gear. It is to be understood that the lever F, in lieu of being above the radiating movable spanner or lever A, may be below it, in which case the links E, H, and M would be on the other side of the simple lever G—that is to say, the entire system would be turned upside down. Instead of the curved slot or bar O, Sheet 1, a link having the same radius may be substituted, as shown in dotted lines at Y, and for return-connecting-rod engines more especially I should prefer the link Y, one end of which would be connected at the center N, the other direct at Y' on the slide-valve rod P' itself, as indicated.

Having fully described the several motions by the diagram on Sheet 1, I shall now proceed to describe the several figures of applications as represented on Sheets 2, 3, 4, and 5.

Figure 1:
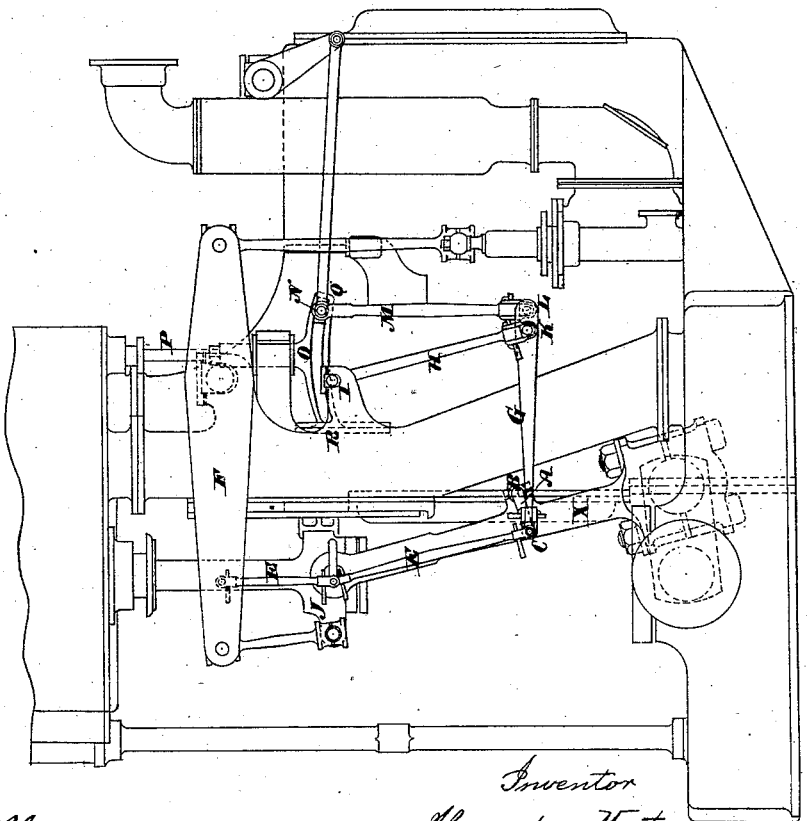

Figures 1 and 2, Sheet 2, represent end and longitudinal elevations of a design of marine engines with inverted cylinders chiefly supported upon a fore-and-aft surface-condenser, with horizontal air and other pumps driven from eccentrics on the crank-shaft. The slide-valves are placed in front, and the radiating stud or center C is actuated by an overhung lever, F, one end of which is driven direct from the piston cross-head J, the other being supported by the vibrating link U, as indicated by diagram, Sheet 1.

Figs. 1 and 2, Sheet 3, represent end and longitudinal elevations of another design of marine engines with inverted cylinders and a surface-condenser athwartships, the pumps being driven by levers F, which also serve the purposes of the levers F in diagram, Sheet 1, and in the engine previously described. These levers are so much overhung as to give the necessary relative motion to the radiating movable point or center C. The slide-valves are at the back of these engines, and consequently much more conveniently placed than those described with reference to Figs. 1 and 2, Sheet 2. The curved slot O is guided by a slipper-guide on the back of the two-legged frame; but the improved gear differs but little otherwise from that just described.

Fig. 1, Sheet 4, shows the arrangement illustrated at Y, Sheet 1, inverted. Under this arrangement the link H, instead of vibrating from a fixed center, I, as hereinbefore described, is connected direct at I to the lever F, thus converting the lever G into a simple link, the end of the link H being connected to the center L, the center K being dispensed with. Fig. 2, Sheet 4, shows the same arrangement in conjunction with the slotted bar O, instead of the link Y, in which case the arrangement is not inverted. I may observe that although only two cylinders are shown in both designs of marine engines, three or any other number may have my improvements applied thereto in part or in whole.

Sheet 5 represents a sufficient portion of an inside-cylinder locomotive-engine to illustrate the application of my improvements thereto. The slide-valves are below the cylinders, and the radiating movable point or center C is actuated by an overhung lever, F, worked direct from a projection on the piston cross-head J, the said projection being carried toward the crank in order that the lever F may clear the cross-head center when the engine is at the termination of its outward stroke; otherwise the details are as indicated by diagram, Sheet 1.

It is to be understood that in all the arrangements hereinbefore described in which the center K is employed, the center L on the lever G may be within the center K instead of without it, as shown. The reversing may be effected by hand, screw, governor, or any of the well-known hydraulic or other cylinders.

I reserve the right to claim in other applications anything shown or described in this specification and not claimed herein.

What I desire to secure by Letters Patent is—

1. In a steam or other motive-power engine, the combination of apparatus consisting of the short lever or spanner A, centered at one end, B, on a projection on the connecting-rod X, and having a radiating or movable end, C, attached, first, by a link, E, to levers F and U, the said lever F moving through an arc which crosses or is subtended by a line drawn through the centers of the engine; and, second, to the valve-rod P by a lever, G, links H and M, slide-block N, and bar connecting link M to the valve-rod, whereby an equal distribution of steam or other gas to both ends of the cylinder or cylinders is effected, whether in full or intermediate gear, substantially as hereinbefore described.

2. In a steam or other motive-power engine, the combination of mechanism consisting of the short lever or spanner A, centered at one end on a projection on the connecting-rod X, and having a radiating or movable end, C, attached, first, by a link, E, to levers F and U, the said lever F moving through an arc which crosses or is subtended by a line drawn through the centers of the engine; and, second, to the valve-rod P by a simple lever, G, links H, M, and Y, the latter link being substituted for the curved slot or bar O, whereby an equal distribution of steam or other gas to both ends of the cylinder or cylinders is effected, whether in full or intermediate gear, substantially as hereinbefore described.

In testimony whereof I have hereunto set my hand and seal this 30th day of November, 1882.

ALEXR. MORTON. [L. S.]

In presence of—
GEO. MACAULAY CRUIKSHANK,
THOS. STIRLING BROWN,
*Both of 135 Buchanan Street, Glasgow.*